(12) United States Patent
Risse et al.

(10) Patent No.: US 8,308,180 B2
(45) Date of Patent: Nov. 13, 2012

(54) TRAILER VEHICLE CONNECTION ARRANGEMENT

(75) Inventors: Rainer Risse, Pattensen-Reden (DE); Udo Ronnenberg, Wedemark (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/127,080

(22) PCT Filed: Aug. 1, 2009

(86) PCT No.: PCT/EP2009/005591
§ 371 (c)(1),
(2), (4) Date: Jun. 13, 2011

(87) PCT Pub. No.: WO2010/060494
PCT Pub. Date: Jun. 3, 2010

(65) Prior Publication Data
US 2011/0233895 A1    Sep. 29, 2011

(30) Foreign Application Priority Data

Nov. 3, 2008    (DE) .......................... 10 2008 054 364

(51) Int. Cl.
*B60D 1/62* (2006.01)

(52) U.S. Cl. ...................................... 280/420
(58) Field of Classification Search .................. 280/420, 280/421, 428, 433
See application file for complete search history.

(56) References Cited

U.S. PATENT DOCUMENTS

| | | | |
|---|---|---|---|
| 5,458,357 A | 10/1995 | Wohlhuter | |
| 7,347,507 B1 | 3/2008 | Stillinger | |
| 7,967,319 B2 * | 6/2011 | Alguera | 280/420 |
| 2003/0222774 A1 | 12/2003 | Koenigsberg et al. | |
| 2006/0244305 A1 | 11/2006 | Hilberer | |

FOREIGN PATENT DOCUMENTS

| | | |
|---|---|---|
| DE | 37 26 822 A1 | 12/1988 |
| FR | 1236432 | 9/1959 |
| GB | 2 204 844 A | 11/1988 |
| GB | 2 425 760 A | 11/2006 |
| WO | WO 2005/102744 A1 | 11/2005 |
| WO | WO 2006/032355 A1 | 3/2006 |
| WO | WO 2006/066819 A1 | 6/2006 |
| WO | WO 2008/038313 A1 | 4/2008 |

* cited by examiner

*Primary Examiner* — Tashiana Adams
(74) *Attorney, Agent, or Firm* — Kramer Levin Naftalis & Frankel LLP

(57) ABSTRACT

A connection arrangement for a trailer vehicle includes at least two connections of the following connections suitable for a towing vehicle-end connection: a) a first electrical connection for a brake system, b) a second electrical connection for a lighting system, c) a first pneumatic connection for a brake line, d) a second pneumatic connection for a supply line, and at least two lines for connecting a respective connection to a corresponding trailer-end component. The at least two lines are combined, at least in sections, to form a common cable harness.

16 Claims, 2 Drawing Sheets

TRAILER VEHICLE CONNECTION ARRANGEMENT

FIELD OF THE INVENTION

The present invention generally relates to a connection arrangement for a trailer vehicle.

BACKGROUND OF THE INVENTION

Trailer vehicles are generally known. Trailer vehicles are used, in particular, for heavy goods vehicles, for example as semi-trailers for a semi-trailer truck or as a trailer. In this case, trailer vehicles for heavy goods vehicles have a large number of trailer-end components, for example a lighting system or a brake system. In order to control such components from a towing vehicle and to supply compressed air and power to such components, it is known to provide a trailer vehicle with a connection arrangement. A connection arrangement usually includes a plurality of connections that are suitable for a towing vehicle-end connection and a plurality of lines for connecting the connections to trailer-end components. A trailer vehicle for a heavy goods vehicle usually has the following connections: a) a first electrical connection for a brake system, b) a second electrical connection for a lighting system, c) a first pneumatic connection for a brake line, and d) a second pneumatic connection for a supply line, where the brake line and the supply line are associated with the brake system.

The connections are generally arranged on an end face of the trailer vehicle in order to establish a simple connection to the towing vehicle. To equip a trailer vehicle with such a connection arrangement, it is customary to first mount the connections on a chassis that forms part of the trailer vehicle. The lines are then individually laid from a connection to a respective trailer-end component that is associated with that connection.

SUMMARY OF THE INVENTION

Generally speaking, it is an object of the present invention to provide a connection arrangement for a trailer vehicle that can be mounted on a trailer vehicle with comparatively little work. It is a further object of the invention to provide a trailer vehicle having a connection arrangement of this kind.

According to embodiments of the invention; the connection arrangement includes at least two connections of the following connections for a towing vehicle-end connection: a) a first electrical connection for a brake system, b) a second electrical connection for a lighting system, c) a first pneumatic connection for a brake line, d) a second pneumatic connection for a supply line, and at least two lines for connecting a respective connection to a corresponding trailer-end component the at least two lines being combined, at least in sections, to form a common cable harness.

By combining lines to form a common cable harness, the mounting work for laying the lines can be reduced compared to laying the lines separately. In particular, the lines can be combined, at least in sections, to form a common cable harness even before the connection arrangement is mounted on a trailer vehicle, thus, additionally reducing the mounting work.

The lines can be formed, for example, by cables, tubes or hoses depending on the medium that is to be transmitted. In particular, one line can include a plurality of individual lines. For example, the line that connects the first electrical connection to a trailer-end brake system can have a plurality of individual lines for supplying power and for data transmission.

The cable harness preferably extends, starting from an end face of the trailer vehicle, at least into a rear half of the trailer vehicle, and preferably into a rear region of the trailer.

The lines are preferably combined to form a cable harness by means of at least one holding device, for example, a cable tie, a clip or a sheath, such as a hose. Alternatively, the lines can be combined in a cohesive manner by means of an adhesive, for example, by encapsulation with plastic. If the connection arrangement additionally includes a housing on which at least two connections are arranged and/or at least two connections are at least partially formed by the housing, the lines that are associated with the connections can be combined to form a common cable harness within the housing.

Still other objects and advantages of the present invention will in part be obvious and will in part be apparent from the specification.

The present invention accordingly comprises the features of construction, combinations of elements, and arrangement of parts, all as exemplified in the constructions herein set forth, and the scope of the invention will be indicated in the claims.

BRIEF DESCRIPTION OF THE DRAWINGS

The invention will be described in greater detail below using exemplary embodiments and with reference to the appended drawings, in which.

Identical components or components which correspond to one another are provided with the same reference symbols in the figures.

DETAILED DESCRIPTION OF THE PREFERRED EMBODIMENTS

Figure 1:
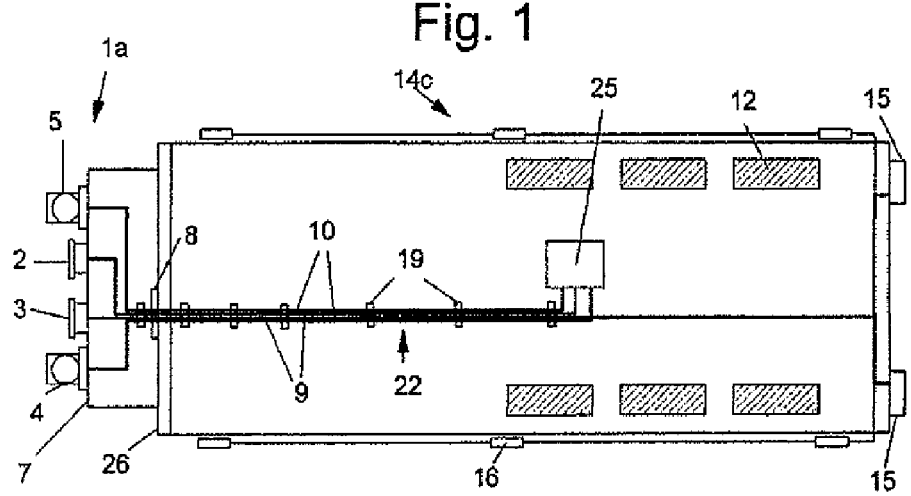
FIG. 1 illustrates a trailer vehicle having connection arrangement according to an embodiment of the invention.
Figure 2:
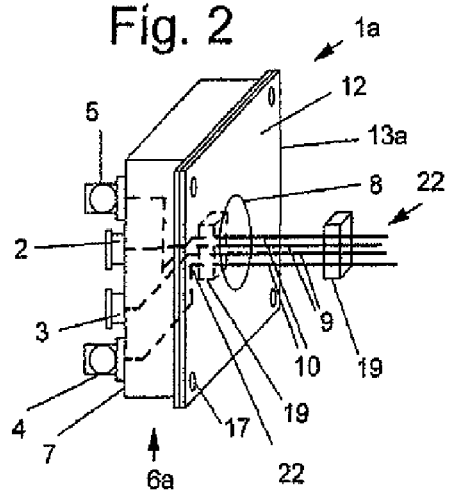
FIG. 2 illustrates the connection arrangement according to an embodiment of the invention.

FIG. 1 illustrates a trailer vehicle 14a that includes a connection arrangement 1a. The connection arrangement 1a is shown on its own as connection arrangement 1b in FIG. 2.

The connection arrangement 1a can include four connections 2, 3, 4, 5 provided for a towing vehicle-end connection of components of a trailer, such as an electronic brake system 25 and a lighting system having rear lights 15 and side lights 16. From amongst the four connections 2, 3, 4, 5, a first electrical connection 2 is provided for the brake system 25, and a second electrical connection 3 is provided for the lighting system. A first pneumatic connection 4 is also provided for a brake line, and a second pneumatic connection 5 is also provided for a supply line. The brake line and supply line are associated with the brake system 25.

The connections 2, 3, 4, 5 are arranged on a towing vehicle-end front face 7 of a box-like housing 6a. The housing 6a is produced from plastic in this case. The housing 6a can optionally be composed of metal, such as, for example, sheet metal. The housing 6a is closed off at its rear end 12 by a housing cover 13a. The connections 2, 3, are in the form of plug receptacles in accordance with ISO 12098 and ISO 763813. Coupling heads 4, 5 are at least partially formed by the housing 6a or are fixed to a fixing device formed by the housing 6a. For example, plug receptacle housings of the electrical connections 2, 3 are injection-molded onto the housing 6a. Furthermore, threaded pins are integrally formed on the housing 6a, and the coupling heads 4, 5 can be screwed onto the threaded pins (not illustrated in the drawing figures).

A line 10 leads from each of the pneumatic connections 4, 5 to the electronic brake system 25. Furthermore, a line 9 similarly leads from the first electrical connection 2 to the electronic brake system 25. The electronic brake system 25 is known and is illustrated only symbolically in FIG. 1. The electronic brake system 25 can have, in particular, a plurality of components that, in turn, can be connected to one another by cables and/or other lines. A further line 9 leads from the second electrical connection 5 to a lighting system, such as rear lights 15 and side lights 16 of the trailer vehicle. The lines 10 are designed to transmit compressed air and the lines 9 are designed to transmit power and data signals.

The lines 9, 10 are connected to the associated connections 2, 3, 4, 5 in the interior of the housing 6a. The lines 9, 10 are led out of the housing 6a via a leadthrough 8. In this case, the leadthrough 8 is formed such that the interior of the housing 6a is sealed off from the outside, in particular against the ingress of moisture. As an alternative, a plurality of leadthroughs 8 can be provided in order to lead the lines 9, 10 out of the housing 6a.

Starting from within the interior of the housing 6a and as far as into the rear half of the trailer vehicle 14a, the lines 9, 10 are combined to form a common cable harness 22. The combination process is performed using a plurality of holding devices 19, such as cable ties. By way of example, clips or sheaths, such as hoses, can also optionally be used. In this case, a holding device 19 is arranged in the interior of the housing 6a. The cable harness 22 is separated in the second half of the trailer vehicle, such that the lines 9, 10 run separately to the brake system 25 and to the lighting system.

For the purpose of mounting the connection arrangement 1a, a plurality of holes 17 are provided in the rear face of the housing 6a, such that the housing 6a can be fixed to an end-face support 26 of a chassis of the trailer vehicle 14a by means of screw connections via the holes 17. In this case, the lines 9, 10 are combined to form a cable harness 22 before the connection arrangement 1a is actually mounted on the trailer vehicle 14a. As an alternative, the lines 9, 10 can also be combined to form a cable harness 22 during mounting of the connection arrangement 1a on the trailer vehicle 14a.

Figure 3:
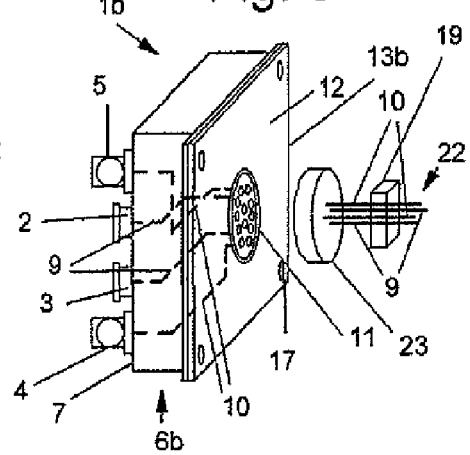
FIG. 3 illustrates a connection arrangement according to an embodiment of the invention.

FIG. 3 illustrates a connection arrangement 1b according to another embodiment of the invention. The connection arrangement 1b corresponds substantially to the connection arrangement 1a, and for this reason only the differences are discussed in the description that follows.

Instead of a leadthrough 8, the connection arrangement 1b has an output connection 11 that is arranged on a rear-face housing cover 13b of a housing 6b that otherwise corresponds to the housing 6a. As an alternative, a plurality of output connections 11 can also be provided. In this case, the output connection 11 is in the form of a plug receptacle, where the plug receptacle housing of the output connection 11 is integrally formed on the housing cover 13. The lines 9, that enter the interior of the housing 6b from the rear face of the connections 2, 3, 4, 5 are led to the output connection 11. A cable harness in the interior of the housing 6b is not formed. The connection arrangement 1b includes a connection device 23, in this case a plug 23, that can be connected to the output connection 11. From the connection device 23, the lines 9, 10 can be led further to the brake system 25 and to the lighting system. In this case, for example, a plurality of holding devices 19 are provided, and the holding devices can be combined to form a cable harness 22 starting just behind the connection device 23.

The connection arrangement 1b makes it possible for the connections 2, 3, 4, 5 and the lines 9, 10 or at least a portion of the lines 9, 10 to be mounted on a trailer vehicle 14 separately. After the connections 2, 3, 4, 5 are separately mounted and the lines 9, 10 are laid, these elements can be connected to the connection device 23 by connection of the output connection 11. The lines 9, 10 can be combined, at least in sections, to form a cable harness 22, in particular before being laid in a trailer vehicle.

Figure 4:
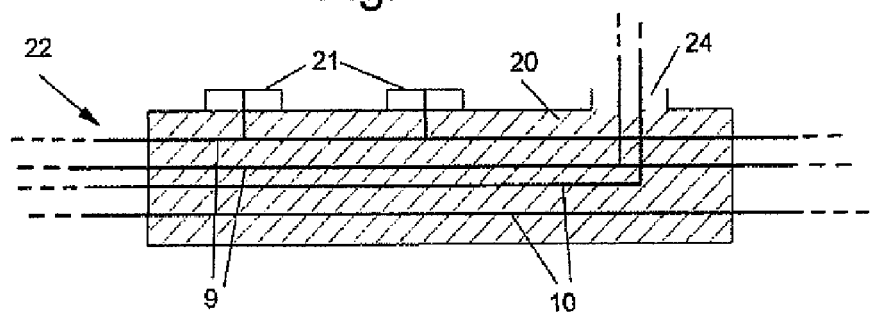
FIG. 4 illustrates a cable harness according to an embodiment of the invention.

FIG. 4 shows a further possible way of combining the lines 9, 10 to form a cable harness 22. Here, the lines are combined in a cohesive manner by means of an adhesive 20. In this case, the adhesive 20 is formed by a plastic with which the lines 9, 10 are encapsulated in portions. One of the lines, in this case a line 9, has a plurality of coupling devices 21 for coupling at least line 9 to trailer-end components. Here, the coupling devices 21 are sockets for a plug connector. The coupling devices 21 are coupled directly to the cable harness 22. Coupling devices 21 of this kind make it possible to connect a further line to one or more points of the cable harness 22. It is advantageous to connect a plurality of trailer-end components to the same line, but also to select, for a connection of a trailer-end component, the coupling device 21 that is located in a position suitable for such a connection.

The latter is particularly relevant when the trailer-end components that are to be connected are located at different positions from case to case. As an alternative, as shown in FIG. 4, a line, in this case a line 10, can also be led out of the plastic casing 20 without interruption, for example via an opening 24.

Figure 5:
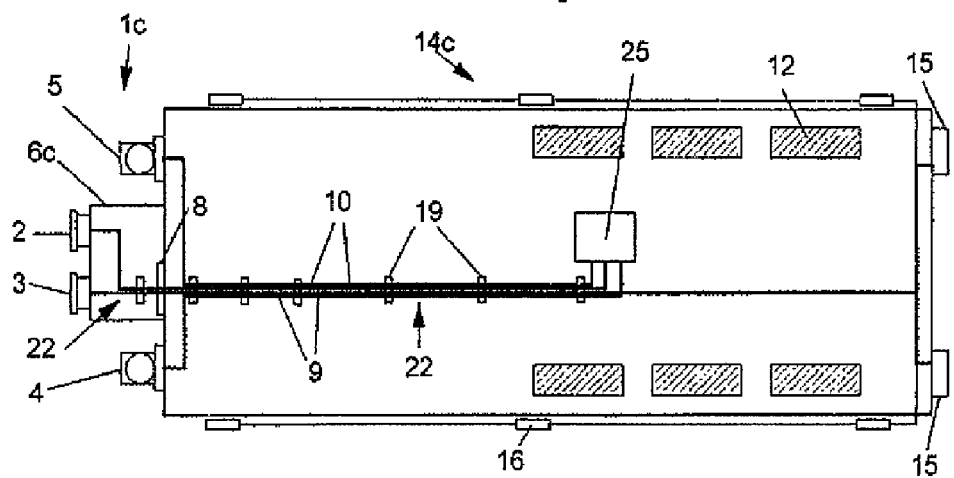
FIG. 5 illustrates a trailer vehicle having a connection arrangement according to an embodiment of the invention.

FIG. 5 illustrates a trailer vehicle 14c having a connection arrangement 1c. In contrast to the previous embodiments of the invention, only first and second electrical connections 2, 3 are arranged on a housing 6c. The first and second pneumatic connections 4, 5 are mounted directly on the trailer vehicle 14c, in this case on a chassis of the trailer vehicle 14c. In the interior of the housing 6c, the lines 9 departing from the electrical connections 2, 3 are combined to form a cable harness 22 by means of a holding device 19. Outside the housing, the cable harness 22 is extended by a further combination with the pneumatic lines 10 that depart from the pneumatic connections 4, 5.

Figure 6:
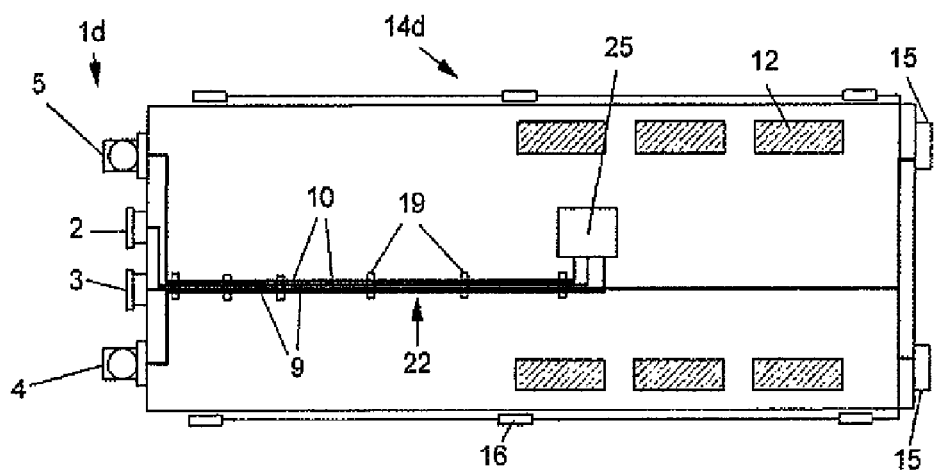
FIG. 6 illustrates a trailer vehicle having a connection arrangement according to an embodiment of the invention.

FIG. 6 shows a trailer vehicle 14d having a connection arrangement 1d. In this embodiment of the invention, both the electrical connections 2, 3 and the pneumatic connections 4, 5 are connected directly to the trailer vehicle 14d, in this case to a chassis of the trailer vehicle 14d. The lines 9, 10 departing from the respective connections 2, 3, 4, 5 are combined to form a cable harness 22 by holding device 19.

The connection arrangement is not restricted to the connections 2, 3, 4, 5. Further connections can be provided, for example connections that take into consideration other standards, or a connection for a brake light power supply device. In addition, lines that depart from such connections can be accommodated in the cable harness.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A connection arrangement for a trailer vehicle, said connection arrangement comprising a first electrical connection for at least one of a brake system and a lighting system; a first pneumatic connection for at least one of a brake line and a supply line; and at least two lines connecting a respective one of said connections to a corresponding trailer-end component, the at least two lines being combinable to form a common cable harness.

2. The connection arrangement as claimed in claim 1, wherein the at least two lines are combined by at least one holding device.

3. The connection arrangement as claimed in claim 2, wherein the at least one holding device comprises at least one of a cable tie, a clip and a sheath.

4. The connection arrangement as claimed in claim 1, wherein the at least two lines are combined by an adhesive.

5. The connection arrangement as claimed in claim 1, wherein at least one line of said at least two lines comprises one or more coupling devices for coupling the at least one line of said at least two lines to the corresponding trailer-end component, the one or more coupling devices being arranged on the cable harness.

6. The connection arrangement as claimed in claim 1, further comprising a housing, wherein the connections are at least one of situated on the housing and at least partially formed by the housing.

7. The connection arrangement as claimed in claim 6, wherein the housing comprises at least one leadthrough for passing the at least two lines.

8. The connection arrangement as claimed in claim 6, wherein the housing comprises a leadthrough for passing the cable harness.

9. The connection arrangement as claimed in claim 6, wherein the housing comprises at least one output connection for connecting to at least one trailer vehicle-end connection of the connection arrangement.

10. The connection arrangement as claimed in claim 9, wherein the at least two lines depart from the output connection via the cable harness.

11. The connection arrangement as claimed in claim 7, wherein the at least one leadthrough is at least one of situated on a housing cover of the housing and at least partially formed by said housing cover.

12. The connection arrangement as claimed in claim 6, wherein the at least two lines are combined to form the cable harness at least one of outside the housing and inside the housing.

13. A trailer vehicle comprising the connection arrangement as claimed in claim 1.

14. The connection arrangement as claimed in claim 1, further comprising a second electrical connection for at least one of said brake system and said lighting system, and a second pneumatic connection for at least one of said brake line and said supply line.

15. The connection arrangement as claimed in claim 1, further comprising a housing, wherein the at least two lines are combined within the housing via at least one of a cable tie, a clip, a sheath, and an adhesive.

16. The connection arrangement as claimed in claim 9, wherein the at least one output connection is at least one of situated on a housing cover of the housing and at least partially formed by said housing cover.

* * * * *